(12) United States Patent
Takei et al.

(10) Patent No.: US 7,112,244 B2
(45) Date of Patent: Sep. 26, 2006

(54) FLUIDIZED BED GRANULATION COATING DEVICE AND FLUIDIZED BED GRANULATION COATING METHOD

(75) Inventors: Narimichi Takei, Tokyo (JP); Takehiko Itou, Tokyo (JP); Takashi Watanabe, Tokyo (JP); Kazuomi Unosawa, Tokyo (JP); Hiroyuki Ooishi, Tokyo (JP)

(73) Assignee: Freund Industrial Co., Ltd., Tokyo (JP)

( * ) Notice: Subject to any disclaimer, the term of this patent is extended or adjusted under 35 U.S.C. 154(b) by 211 days.

(21) Appl. No.: 10/275,031

(22) PCT Filed: Apr. 25, 2001

(86) PCT No.: PCT/JP01/03553

§ 371 (c)(1),
(2), (4) Date: Oct. 31, 2002

(87) PCT Pub. No.: WO01/83098

PCT Pub. Date: Nov. 8, 2001

(65) Prior Publication Data

US 2003/0190417 A1    Oct. 9, 2003

(30) Foreign Application Priority Data

May 1, 2000 (JP) .............................. 2000-132421
Jan. 26, 2001 (JP) .............................. 2001-17840

(51) Int. Cl.
*B05B 17/00* (2006.01)

(52) U.S. Cl. ................................. 118/303; 118/DIG. 5
(58) Field of Classification Search ................ 118/303, 118/DIG. 5; 427/212, 213
See application file for complete search history.

(56) References Cited

U.S. PATENT DOCUMENTS

| 3,036,338 A | 5/1962 | Nack | 18/47.2 |
| 4,343,622 A | 8/1982 | Bruynsells | 23/313 |
| 6,793,964 B1 * | 9/2004 | Hoad | 427/212 |

FOREIGN PATENT DOCUMENTS

| JP | 57-007245 | 4/1985 |
| JP | 61-088078 | 5/1986 |
| JP | 62282629 A | 12/1987 |
| JP | 1-228535 | 9/1989 |

OTHER PUBLICATIONS

PCT Publication No. WO 01/83098A1 with International Search Report attached for PCT Serial No. PCT/JP01/03553.

* cited by examiner

*Primary Examiner*—Elena Tsoy
(74) *Attorney, Agent, or Firm*—McCormick, Paulding & Huber LLP

(57) ABSTRACT

Under the granulating section 10a for performing fluidized-bed granulation coating of powder grains, a drying section 20a for drying powder grains granulated is provided. A drying section 30a for drying the powder grains that are not sufficiently dried is provided under the drying section 20a. A product discharging section 40a for discharging a dried product is provided under the drying section 30a. A fluidized-bed forming-gas is supplied downward to upward, and granulation and dryness are continuously performed by the fluidized-bed forming-gas, and the powder grains moved from the granulating section to the drying section located immediately thereunder are pneumatic classified.

4 Claims, 11 Drawing Sheets

POWDER GRAIN DISCHARGE POSITION    POWDER GRAIN SUPPLY POSITION

FLUIDIZED BED GRANULATION COATING DEVICE AND FLUIDIZED BED GRANULATION COATING METHOD

REFERENCE TO PRIOR APPLICATION

This application is entitled to the benefit of and incorporates by reference essential subject matter disclosed in PCT Patent Application No. PCT/JP01/03553 filed on 25 Apr. 2001; Japanese Application No. 2000-132421 filed 01 May 2000; and Japanese Application No. 2001-17840 filed 26 Jan. 2001.

TECHNICAL FIELD

The present invention relates to a granulation coating technique for performing continuously a process such as granulation, coating, mixing, agitation, drying or the like of powder grains with the powder grains fluidized.

BACKGROUND ART

A fluidized-bed device can perform granulation coating and drying of pharmaceuticals, food or the like within a single device and has an airtight structure, so that it is a suitable device in view of GMP. Therefore, granulation substances obtained by using this have characteristics of comparatively porous and amorphous shapes and good solubility, and so are widely utilized.

While there are many kinds of fluidized-bed devices (for example, "Granulation Handbook", edited by The Association of Powder Process Industry and Engineering, Japan, published from Ohmsha, pp.283–348), the devices are roughly divided into a batch type and a continuous type (including a semi-continuous type and a continuous type) as methods of operation.

Presently, in most cases of performing granulation for pharmaceuticals or the like, the batch type of the device is utilized. This is because the batch type thereof is more suitable for obtaining uniform granulation substances in particle size, and is superior in view of GMP since satisfactory dry products can be obtained within the same device and no generated particles need to be transferred to another drying device.

In contrast thereto, in the continuous type as illustrated, for example, in FIG. 7.56 of page 301 and FIG. 7.57 of page 302 in the "Granulation Handbook", raw materials are continuously injected and granulation substances classified by a principle of pneumatic classification or the like are continuously discharged. This does not need independent steps preceding and following a main step of raw material injection, preliminary mixing, heating, cooling, discharging or the like, and therefore the processing time thereof is shortened. Control and management of the step can be also facilitated since performing stationary operations becomes possible theoretically.

However, since particles of all stages of a granulation process are included in a fluidized-bed obtained by using the continuous type thereof, the particles are classified by the pneumatic classification and are discharged and so there are such drawbacks that classification effect is difficult to expect entirely and a particle size distribution of products to be discharged becomes large, and that products to be dried completely are not obtained since the granulation substances are discharged from a fluidizing chamber in which binder liquids are continuously sprayed, and the like.

Suggestions have been made for improving these drawbacks. For example, the device disclosed in Japanese Patent Laid-open No. 62-282629 is provided with a drying chamber adjacent to a granulation chamber, but the drying chamber has a drying effect and contributes to no improvement in a particle size distribution. Also, the devices described in FIG. 7.59 and FIG. 7.61 of page 303 of the "Granulation Handbook" are each provided with a classifier to keep particle sizes uniform. However, these devices are each suggested as a system and they themselves are not necessarily improved. Therefore, non-uniformity of particle sizes of the products obtained by the continuous type remains fatefully without being improved.

Also, since the batch type of the device intermittently performs injection and discharge, an operating property of the semi-continuous type has an intermediate property of those of the batch type and the continuous type and the semi-continuous type is a type more similar to either one regarding the relation between an injection and discharge amount and a process amount (a retention amount). Therefore, a merit and demerit of the semi-continuous type has an intermediate property of those of both types.

To compensate for such a demerit of the continuous type as described above, the device of a batch type is used in granulation, coating and the like of pharmaceuticals. However, the device has a problem of scaling up the fluidized-bed device as the production thereof is scaled up.

More particularly, upsizing the device causes extensions of the time required for a batch in comparison to a small-sized device, so that the production capacity per unit time does not become proportional to a charge amount but will be below the charge amount. This is because while the amount of charge increases in proportion to a device size to the third power, an amount of fluidizing gas for maintaining an optimal fluidized condition is proportional to the device size to the second power (cross section area) and a drying speed of contents is proportional to the amount of fluidizing gas and so the time required for the drying increases in proportion to the device size.

In a large-sized device, a bulk density of the granulated particles becomes large and thereby the above-mentioned advantages of the fluidized-bed granulation substances are reduced. It is thought that this is because the particles continuously repeat movements of dropping to a bottom portion thereof even during fluidization and thereby weight of the particles in being temporally deposited becomes larger than that of a small-sized device.

Even from the viewpoint of operation, the larger the device becomes, the more difficult maintaining a good fluidizing condition becomes and faulty fluidizing conditions such as channeling, bubbling, slagging or the like are likely to occur.

As described above, since it is not favorable to upsize the fluidized-bed device to a more degree than a certain degree, small-sized devices with used experience are arranged in parallel and the same granulating processes is performed by at least two of the small-sized devices.

However, in this method, it is likely that there will arise problems of no improvement in a floor area for setting the devices and/or in production efficiency per worker as the production scale is increased, and of being unable to enjoy merits of mass production, and further of non-uniform quality of the granulation substances owing to unevenness of respective operating conditions between the devices. This is because there is also the fact that, in the fluidized-beds, the number of operating conditions is large in comparison with other granulating methods and this method is more easily developed than other methods owing to an influence of the unevenness.

Therefore, the present inventors have considered that a continuous type device, which takes an advantage of the merits of a batch type device and improves producing capability per floor area, must be developed.

An object of the present invention is to provide a fluidized-bed granulation coating device such that the handling based on each of the steps constituting a fluidized-bed granulation coating process is vertically constituted as a batch method and thereby each of the steps constituted as such a batch method is processed continuously.

An object of the present invention is to provide a fluidized-bed granulation coating method, such that the handling based on each of the steps constituting a fluidized-bed granulation coating process is continuously done upward to downward.

SUMMARY OF THE INVENTION

A fluidized-bed granulation coating device according to the present invention is characterized by: a cylindrical main body provided with an exhaust port in an upper direction and a gas supply port in a lower direction, a cylinder direction thereof being divided into the upper and lower directions; a partition means partitioning a cylindrical interior of said main body into a plurality of sections in the upper and lower directions and passing a fluidized-bed forming-gas flowing from said gas supply port to said exhaust port; and a powder grain passing means in which powder grains fall by gravity to pass between the sections in the upper to lower direction, wherein a spray nozzle is provided in one section or more of said plurality of sections, and a product discharge means is provided in a lower section of said plurality of sections.

For example, the device is constituted such that said spray nozzle may be provided in the uppermost section and said product discharge means may be provided in the lowermost section. Said powder grain passing means may be formed, for example, in a powder grain passing port opened in said partition means. An opening/closing means may be provided, for example, in said powder grain passing port. In said one section or more of said plurality of sections, an auxiliary gas supply port for supplying an auxiliary gas other than said fluidized-bed forming-gas into the one section or more may be provided, for example.

Further, any one of the above-mentioned configurations is characterized in that a drying section is provided between the uppermost section and the lowermost section of the plurality of sections, and that said drying section comprises: a plurality of dry chambers provided with powder grain receiving ports and powder grain discharge ports, and passing the fluidized-bed forming-gas in the lower to upper direction; a drying chamber drive means for moving said powder grain receiving ports of said plurality of drying chambers, in a side of said powder grain passing means provided in the partition means partitioning said drying chambers from the sections located immediately thereon, and for moving said powder grain discharge ports of the plurality of drying chambers, in a side of said powder grain passing means provided in the partition means partitioning said drying chambers from the sections located immediately thereunder; and a blowing chamber provided under said drying chambers and supplying said fluidized-bed forming-gas into said drying chambers in the lower to upper direction.

Said plurality of drying chambers are characterized by being provided at radial positions relative to a rotating shaft rotated by said drying chamber drive means. The interior of said blowing chamber is characterized by being partitioned into a plurality of spaces, and fluidized-bed forming-gases having different flow rates are supplied into said respective spaces. The powder grain discharge ports of said drying chambers are characterized by passing through the interior of said blowing chamber and communicating with said product discharging section through a powder grain passing path into which said fluidized-bed forming-gas is not supplied.

A fluidized bed granulation coating method that is another present invention is characterized by: partitioning upward to downward, into sections, a powder grain processing step of handling powder grains in a fluidized-bed state; pneumatic classifying, against a fluidized-bed forming-gas, the powder grains having been handled in one immediately upper section of the sections adjacent to one another to move to one lower section thereof; and thereby performing granulation and/or coating and drying of said powder grains while said powder grains pass upward to downward.

Such fluidized-bed granulation coating method is characterized in that granulation and/or coating are performed in the uppermost section of the plurality of sections of said fluidized-bed granulation coating device. The powder grains subjected to a granulating process and/or a coating process may be dried, for example, in one section or more other than said uppermost section. The coating may be performed, for example, in any one of the sections other than said uppermost section. A process extending from the granulation and/or coating of said powder grains to a product discharge may be continuously performed, for example. Or, the process extending from the granulation and/or coating of said powder grains to the product discharge may be intermittently performed while a downward movement of said powder grains may be interrupted, for example, until the completion of an upper process. An auxiliary gas other than said fluidized-bed forming-gas is supplied, for example, into one section or more of said plurality of sections.

An outline of the invention of the above-mentioned configuration disclosed in this application will be briefly described below. In the present invention, the cylindrical interior of the cylindrical main body of which a cylindrical direction is divided into the upper direction and the lower direction is partitioned into a plurality of sections in the upper and lower directions by the partition means. In such plurality of sections, for example, the uppermost section is formed as a section having the spray nozzle, and the lowermost section is formed as a section having the product discharge means, and the partition means is constituted so that a gas can pass therethrough. Therefore, by sucking from the upper exhaust port of the main body, the fluidized-bed forming-gas is introduced from the gas supply port provided at the lower portion of the main body, into the cylinder of the main body. The fluidized-bed forming-gas introduced passes downward to upward in the plurality of sections while passing through the partition means.

For example, when granulating is to be performed, the powder grains supplied into the uppermost section are granulated while coming to a fluidized-bed state by the fluidized-bed forming-gas. The granulated powder grains are sent to the lower section by the powder grain passing means, and the powder grain process appropriately needed as occasion demands, such as coating and drying and the like, is performed in the lower section. The product thus manufactured is finally sent to the production discharging section in the lowermost section and is discharged as a product.

The powder grains granulated in the uppermost section are moved to the lower section, against the fluidized-bed forming-gas due to their own weights by using the fluidized-bed forming-gas passing downward to upward, for example, through the powder grain passing means such as a powder grain passing port or the like opened in the partition means. Namely, the powder grains falling through the powder grain passing means by gravity due to their own weights are pneumatic classified by the fluidized-bed forming-gas passing downward to upward.

For this reason, unlike the configuration in which a pneumatic classifier is arranged by a granulation coating device, no powder grain convey mechanism for conveying the powder grains to the pneumatic classifier is required, and so the device configuration can be made simple and the reduction in the installation area thereof can be also reduced at once.

In the above-mentioned configuration of the present invention, since the fluidized-bed forming-gas passes downward to upward through the plurality of sections vertically partitioned, the drying of the powder grains coming to a wet state after the granulation can be performed by the fluidized-bed forming-gas which is dried before the fluidized-bed granulation coating of the powder grains. More specifically, in the present invention, since the fluidized-bed forming-gas is used for not only essential fluidized-bed granulation coating of the powder grains but also pneumatic classification and drying, the device configuration can be eminently simplified in comparison with the configuration in which the fluidized-bed forming-gas is separately supplied to pneumatic classification, drying and the like.

Further, as occasion demands, an auxiliary gas may be separately supplied which is different from the fluidized-bed forming-gas. Namely, by providing the auxiliary gas supply port in one section or more of the main body of the present invention and by supplying the auxiliary gas therefrom, for example, effects such as the above-mentioned pneumatic classification, control of the fluid state, prevention of adhesion of the powder grains to the wall surface, and the like can be shown.

In particular, wet and heavy particles are in the upper section, and dry and light particles are in the lower section. Therefore, in order to keep them good fluid states at the same time, the fluid gas speed in the upper section must be high and the auxiliary gas is preferably introduced.

The powder grain passing port serving as the powder grain passing means may be formed, for example, in a ring shape along the inner circumferential surface of the cylinder of the main body. Further, in such powder grain passing port, the opening/closing means constituted by a slide gate or a movable tube or the like may be provided. When the powder grain passing port is designed to be thus opened/closed, the powder grain passing port is opened at the time of completing the process of each section and the powder grains can be sent into the lower section.

By doing so, unlike a configuration in which the powder grains can always pass through the powder grain passing port without providing the opening/closing means, the un-dried powder grains can be prevented from falling in the lower section during the process in the upper section. At the time of completing the process of each section, fluidization is stopped and a product in the lowermost section is first discharged, and then particles in the upper section thereof is dropped in the lowermost section. In this manner, the particles in the upper section are sequentially sent to the section next thereto, whereby a so-called batch continuous process can be performed.

Further, the device of the present invention can be used for not only granulation but also particle coating. In this case, similarly to the case of the above-mentioned granulation, coating may be performed in the uppermost section. Additionally, after the granulation, coating can also be performed in the lower section of the same device.

Further, like the above-mentioned configuration, the drying section provided between the uppermost section and the lowermost section can be moved, by the drying chamber drive means, at a side of the powder grain passing means providing the powder grain receiving port with the partition means of the section located immediately on the powder grain receiving port. Therefore, the powder grains processed in the upper section are supplied to each of the plurality of drying chambers through such powder grain passing means.

Since the blowing chamber is provided under the drying chambers, the powder grains supplied into the drying chambers come to a fluidized-bed state by the fluidized-bed forming-gas passing downward to upward, thereby being dried. In drying, since being fed in each drying chamber, the powder grains each come to a subdivided state. Therefore, the powder grains that are in fluidized-bed states in the respective drying chambers are sufficiently dried.

Further, the powder grain exhaust port of each drying chamber is moved, by the drying chamber drive means, in a side of the powder grain passing means provided in the partition means between each drying chamber and the section located immediately thereunder. Therefore, the powder grains fed into each drying chamber and dried therein are exhausted into the lower section through the powder grain exhaust port and the powder grain passing means.

As the powder grain receiving port, for example, the upper portion of each drying chamber may be constituted as a port that is always open. Further, the powder grain exhaust port may be constituted, for example, by an opening provided, as an openable/closable lid in the bottom surface side of each drying chamber, with a wire net through which the fluidized-bed forming-gas can pass.

If the section located immediately on the drying chamber is the fluidized-bed granulation coating section and the lowermost section is the product discharging section, the powder grains subjected to a granulating process or a coating process or both granulating and coating processes in the section located immediately thereon are dried in a plurality of drying chambers of the drying section and then are discharged as a product from the lowermost section.

Further, by employing the configuration of providing the plurality of drying chambers, the powder grains supplied into the respective drying chambers stay in the drying chambers until the powder grain exhaust port of each drying chamber is positioned in the side of the powder grain passing means located immediately thereunder by the drying chamber drive means. Namely, while staying in each drying chamber, the powder grains supplied from the powder grain receiving port each come to a subdivided stat and then to a fluidized-bed state by the fluidized-bed forming-gas passing downward to upward and are dried. Therefore, the powder grains are dried for a sufficient long period of time.

In a conventional technique, when the powder grains are sufficiently dried in one drying chamber, it has been thought for only a drying process to be performed by a batch method while the discharge of the production from each drying chamber is temporarily stopped. In this case, however, the supply of the powder grains into each drying chamber, the reception of the product discharged from each drying chamber, and the like cannot be performed while the drying process is performed by the batch method, whereby the process performed before and after the drying section for the powder grains cannot help being temporarily stopped.

However, in the configuration of sequentially moving the plurality of drying chambers similarly to the above-mentioned configuration, while being supplied into one drying chamber, the powder grains are dried in another drying chamber and the dried powder grains are at one discharged from the powder grain exhaust port of still another drying chamber. Namely, the same drying process as that performed by a so-called continuous method can be performed. Meanwhile, the drying process of powder grains is performed by a batch method until the powder grains are supplied and discharged. More specifically, the configuration of the present invention has both merits of the continuous method and the batch method simultaneously and so is capable of continuously performing the reception, drying, and discharge of powder grains and, at the same time, of sufficiently drying the powder grains by a batch method.

Therefore, by using the fluidized-bed granulation coating device and the fluidized-bed granulation coating method according to the present invention, the powder grains can be supplied from upward and the powder grain products granulated and dried from downward can be continuously manufactured. Thus, even when mass production is to be performed, scaling up the device is not required and no problems in quality assurance or the like occur when the device is scaled up.

DESCRIPTION OF THE PREFERRED EMBODIMENTS

Embodiment 1

Figure 1:
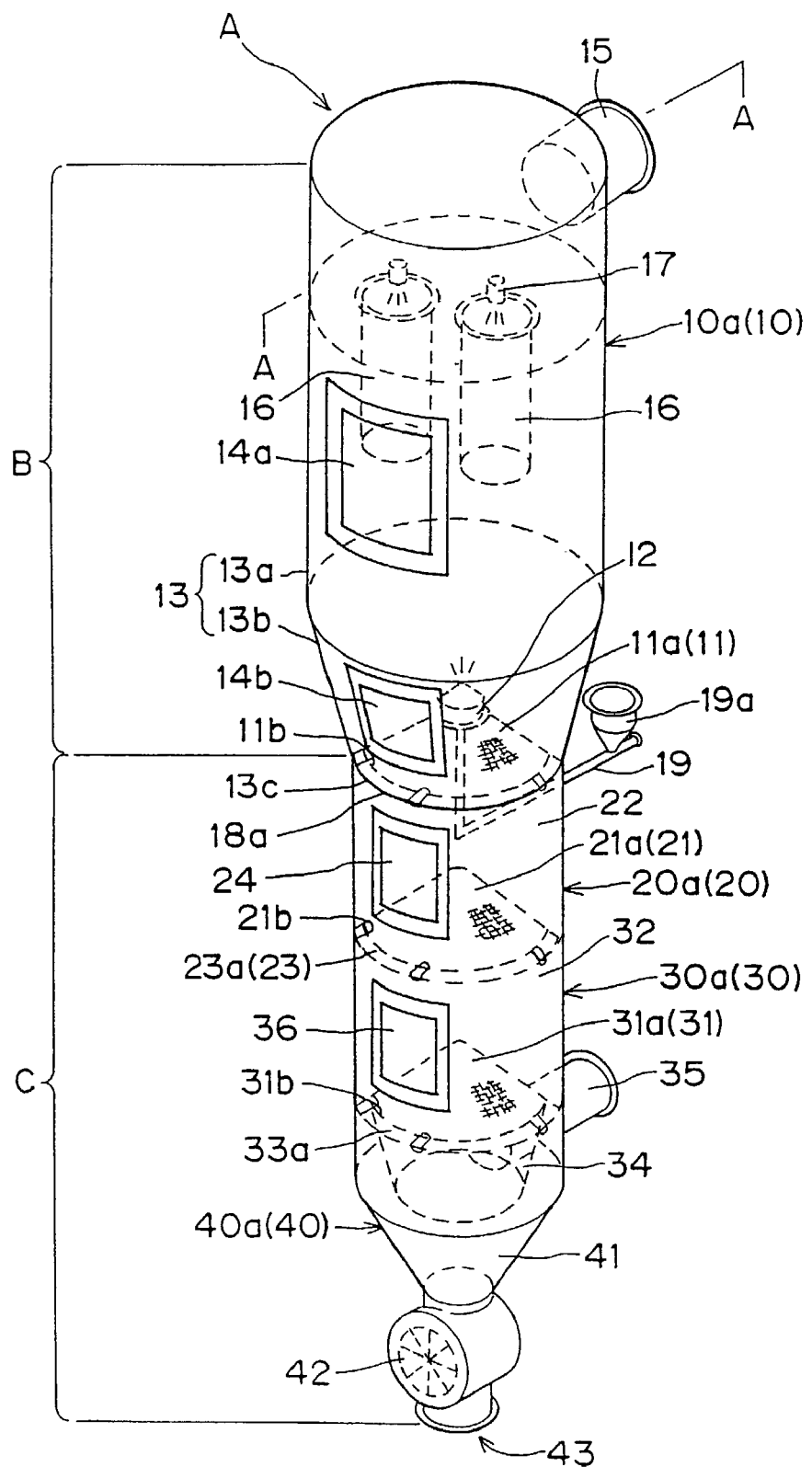
FIG. 1 is a perspective view of a fluidized-bed granulation coating device that is an embodiment of the present invention.
Figure 2:
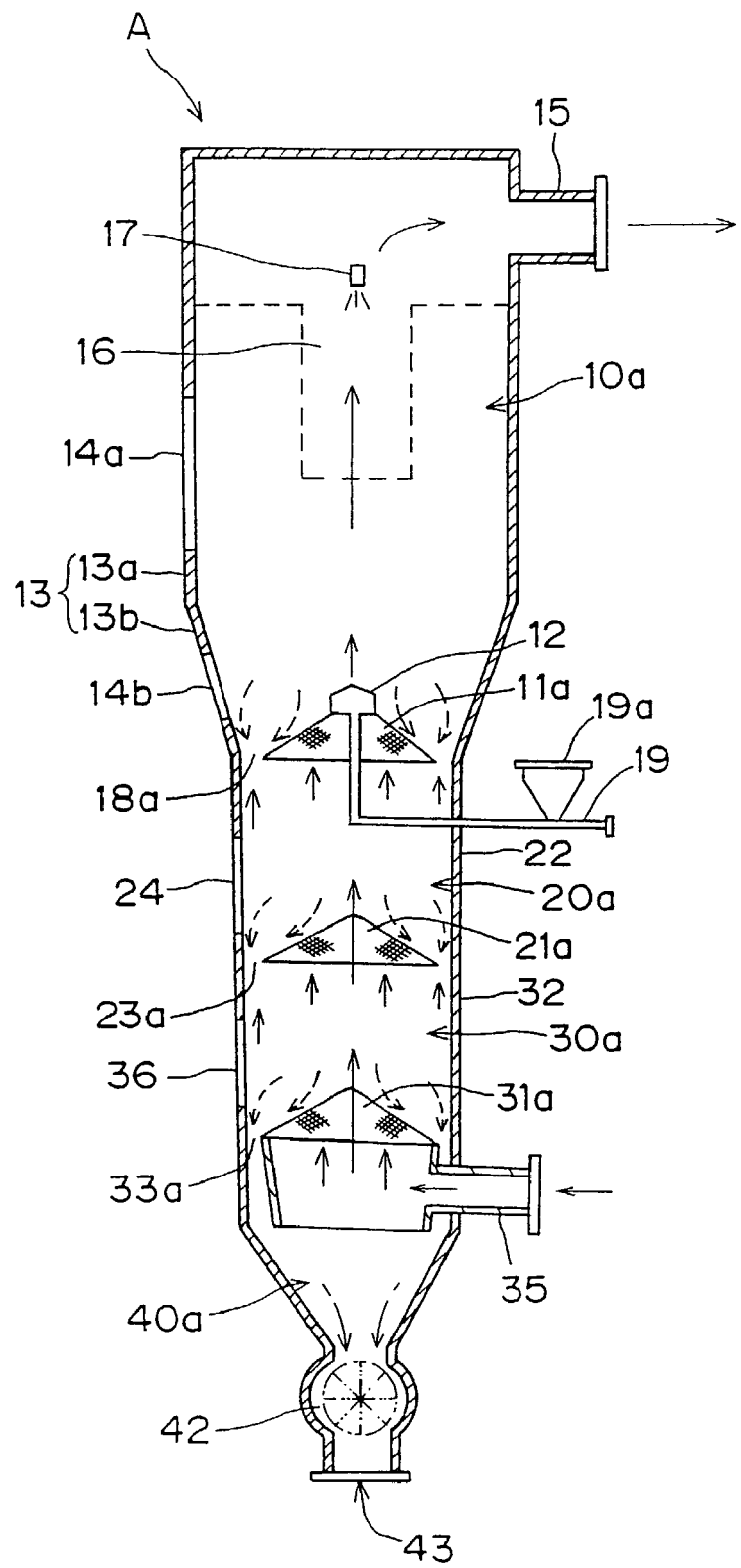
FIG. 2 is a cross-sectional view of the fluidized-bed granulation coating device.

An embodiment of the present invention will be described below and in detail with reference to the drawings. FIG. 1 is a perspective view showing a fluidized-bed granulation coating device according to the present invention. FIG. 2 is a cross-sectional view of the fluidized-bed granulation coating device shown in FIG. 1.

A fluidized-bed granulation coating device, as shown in FIG. 1, comprises a main body A constituted by a large-diameter cylinder portion B and a small-diameter cylinder portion C, which are formed in a straightly cylindrical shape. The main body A is formed in a substantially vertical cylindrical shape, i.e., as a straightly cylindrical type. The cylindrical interior of the main body A is sequentially partitioned and divided vertically into a plurality of sections 10, 20, 30 and 40 by using partition means 11, 21 and 31.

The large-diameter cylinder portion B and the small-diameter cylinder portion C are divided by the partition means 11, and the interior of the small-diameter cylinder portion C is divided into the respective sections 20, 30 and 40 by the partition means 21 and 31.

The fluidized-bed granulation coating device, as shown in FIG. 1, is formed as a straight cylindrical type in which the sections 10, 20, 30 and 40 having each step function of a fluidized-bed granulation coating process are sequentially and vertically connected to one another.

A spray nozzle 12 is provided in the section 10, whereby a granulating section 10$a$ (10) having a granulating function of the fluidized-bed granulating process is constituted. The granulating section 10$a$ is formed in the large-diameter cylinder portion B. The large-diameter cylinder portion B is constituted by a cylinder 13 comprising: a straight cylinder portion 13$a$ whose an upper end is closed; and a lower cylinder portion 13$b$ which is continuously provided under the straight cylinder portion 13$a$ and is downward formed in a taper shape. In the side surfaces of the straight cylinder portion 13$a$ and the lower cylinder portion 13$b$, the observation hatches 14$a$ and 14$b$ are provided, so that a granulating state can be checked therethrough.

In an upper side surface of the straight cylinder portion 13$a$, an exhaust pipe 15 through which the interior of the cylinder communicates with the outside is provided as an exhaust means. As shown in FIG. 1, bug filters 16 are provided in the straight cylinder portion 13$a$, and a pulse jet nozzle 17 for preventing each bug filter 16 from clogging is provided at the upper portion of each bug filter 16. Note that a shaking means may be employed as a means for preventing each bug filter from clogging.

In a side of a lower opening 13$c$ of the lower cylinder portion 13$b$ corresponding to the boundary between the large-diameter cylinder portion B and the small-diameter cylinder portion C, a partition wire net 11$a$ obtained by forming a predetermined mesh wire net in a substantially conical shape is provided as the partition means 11. A powder-grain passing means is provided in the partition means 11. By forming a large-diameter portion 11$b$ of the partition wire net 11$a$ to have a diameter smaller than the internal diameter of the lower opening 13$c$, and by providing the partition wire net 11a to have the gap between the large-diameter portion 11b and the inner circumferential surface of the lower opening 13c, and by forming a ring-like slit 18a around the partition wire net 11a, a powder grain passing port 18 may be formed as a powder grain passing means.

As described above, the small-diameter cylinder portion C partitioned from the large-diameter cylinder portion B by the partition means 11 is sequentially divided into a drying section 20a, a drying section (short-pass prevention section) 30a, and a product discharging section 40a by the partition means 21 and 31.

The drying section 20a (20) is formed by a substantially straight cylindrical cylinder 22 whose an upper portion is partitioned immediately under the granulating section 10a through the partition means 11 and whose a lower portion is partitioned from the short-pass prevention section 30a through the partition means 21.

To the interior of the cylinder 22, a material supply pipe 19 communicates with the outside through the sidewall of the cylinder 22. The spray nozzle 12 described above is provided at the tip of the material supply pipe 19. The spray nozzle 12 projects from the conical top of the above-mentioned partition wire net 11a formed in a substantially conical shape, into the granulating section 10a.

A material supply hopper 19a is connected to the material supply pipe 19 on the way thereof. The pipe end of the material supply pipe 19, although not shown, is connected to, for example, a supply source of a solution such as a binder or the like, so that the binder and powder grains can be spouted from the spray nozzle 12 together with a pressure gas. In this case, the spray nozzle 12 may be constituted as a 3-fluid nozzle.

Like the lower cylinder portion 13b of the granulating section 10a, in a lower opening of the cylinder 22 constituting the drying section 20a, a partition wire net 21a obtained by forming a predetermined mesh wire net in a substantially conical shape is provided as the partition means 21. A large-diameter portion 21b of the partition wire net 21a is formed to have a diameter smaller than the internal diameter of the cylinder 22 of the drying section 20a, and a powder grain passing port 23 constituted as a ring-like slit 23a is provided between the large-diameter portion 21b and the inner circumferential surface of the cylinder 22. An observation hatch 24 is provided in the side surface of the cylinder 22, whereby a drying state can be checked therethrough.

The section 30, which is constituted as the drying section 30a, is provided under the drying section 20a. The drying section 30a (30) is formed by a substantially straight cylindrical cylinder 32 whose an upper portion is partitioned from the drying section 20a by the partition wire net 21a and whose a lower portion is partitioned from the product discharging section 40a (40) by the partition means 31. A partition wire net 31a obtained by forming a predetermined mesh wire net in a substantially conical shape is provided as the partition means 31 in the cylinder 32 of the drying section 30a.

A large-diameter portion 31b of the partition wire net 31a is formed to have a diameter smaller than the internal diameter of the cylinder 32 constituting the drying section 30a, and a ring-like slit 33a serving as a powder grain passing port 33 is provided around the large-diameter portion 31b in the same manner as described above. A gas-supply chamber 34 in accordance with the large-diameter portion 31b is provided under the partition wire net 31a, and a gas-supply pipe 35 projects from the inside of the gas-supply chamber 34 as a gas-supply means supplied to the cylinder 32. An observation hatch 36 is provided in the side surface of the above-mentioned cylinder 32, so that a state in the drying section 30a can be checked therethrough as occasion demands.

When the drying section 30a having the above-mentioned configuration is provided, the powder grains having been sent from the drying section 20a can be dried again. Therefore, the powder grains which have not been dried sufficiently in the drying stage 20a can be prevented from directly going (short-passing) to the product discharging section 40a serving as the section 40 connected to the lower portion of the drying section 30. More specifically, the drying section 30a can function as a short-pass prevention section.

The functional section 40 partitioned by the partition wire net 31a serving as the partition means 31 under the drying section 30a is, as described above, constituted by the product discharging section 40a for discharging the powder grains having been dried. The product discharging section 40a comprises: a cylinder 41 continuously connected to the lower opening of the cylinder 32 of the drying section 30a and formed in a downward tapered shape; a rotary valve 42 serving as a product discharging means and communicating with the lower portion of the cylinder 41; and a product discharging pipe 43 communicating with the rotary valve 42.

In the respective sections 10, 20, 30 and 40, although not shown, gas-supply pipes for an auxiliary gas used for, e.g., pneumatic classification, drying, adhesive prevention and the like may be provided.

Embodiment 2

In this embodiment, the case where the granulation of powder grains is performed by using a fluidized-bed granulation coating device having the above-mentioned configuration will be described below. The exhaust pipe 15 provided at the upper portion of the main body A is connected to an intake source and the suction thereof is made, so that a dried fluidized-bed forming-gas (indicated by a solid-line arrow in FIG. 2) is introduce into the gas-supply chamber 34 from the gas-supply pipe 35.

The fluidized-bed forming-gas fed in the gas-supply chamber 34 is, as shown in FIG. 2, fed into the cylinder 32 of the drying section 30a through the mesh of the partition wire net 31a. The fluidized-bed forming-gas fed into the drying section 30a is also fed into the cylinder 22 of the drying section 20a through the slit 23a and the mesh of the partition wire net 21a. The fluidized-bed forming-gas fed into the drying section 20a is further fed into the granulating section 10a through the slit 18a and the mesh of the partition wire net 11a.

Thus, in the fluidized-bed granulation coating device according to the present invention, the fluidized-bed forming-gas passes, downward to upward, through the plurality of sections 30, 20 and 10 vertically connected in the cylinder of the cylindrical main body A. The fluidized-bed forming-gas fed into the granulating section 10a is sucked through the exhaust pipe 15 and is exhausted to the outside of the device.

While the fluidized-bed forming-gas passes, downward to upward, through the sections 40, 30, 20 and 10 as described above, material powder grains and a binder are supplied into the granulating section 10a from the material supply pipe 19. The powder grains and the binder are upward spouted out from the spray nozzle 12 into the granulating section 10a.

The spouted powder grains and binder come to a fluidized-bed state in the cylinder 13 by the above-mentioned fluidized-bed forming-gas, and the powder grains are bound to one another through the binder to granulate particles each having a predetermined weight. The granulated powder grains are classified by a pneumatic classification means to reach the lower function section. Such pneumatic classification means, in the present invention, is constituted as the slit 18a communicating with the upper and lower sections by using the fluidized-bed forming-gas. Of the granulated powder grains, powder grains each having weight smaller than a predetermined weight are flied high by the fluidized-bed forming-gas to be used for granulation, and powder grains each having weight reaching the predetermined weight fall against the upward wind force of the fluidized-bed forming-gas by gravity due to their own weights and are classified.

The granulated powder grains each having the predetermined weight fall, as described above, against the fluidized-bed forming-gas and fall on, e.g., the partition wire net 11a in the granulating section 10a (in the drawing, powder grains each having weight reaching the predetermined weight are indicated by broken-line arrows). Since the partition wire net 11a is formed in a substantially conical shape, the powder grains falling on the partition wire net 11a roll and fall in the peripheral side along conical inclined plane of the partition wire net 11a, thereby reaching, through the slit 18a, the interior of the drying section 20a provided downward.

In the drying section 20a, since the dried fluidized-bed forming-gas passes downward to upward, the granulated and wet powder grains are dried while falling against the dried fluidized-bed forming-gas. The powder grains which fall while being dried in the drying section 20a fall on the partition wire net 21a formed in a substantially conical shape, and roll along the conical inclined plane of the partition wire net 21a, and reach, through the slit 23a, the interior of the drying section 30a provided downward.

Even in the drying section 30a, since the dried fluidized-bed forming-gas passes downward to upward, powder grains that are not sufficiently dried in the drying section 20a are sufficiently dried in the drying section 30a. The powder grains which fall while being dried in the drying section 30a fall on the partition wire net 31a formed in a substantially conical shape, and roll along the conical inclined plane of the partition wire net 31a, and reach, through the slit 33a, the interior of the product discharging section 40a provided downward.

The slits 18a, 23a and 33a that communicate with the upper and lower function sections are designed to be openable and closable. By doing so, for example, if the slits are always open, falling of the powder grains can be continuously made from the upper section to the lower section. Further, if the slits are closed until the handling of the respective sections are completely ended and if the slits are opened when the handling is completed, then falling of the powder grains can be intermittently made from each section to the lower section.

The dried fluidized-bed forming-gas used in the fluidized-bed granulation coating device of the present invention passes, as described above, from the drying section 30a to the drying section 20a. So, the degree of dryness of such fluidized-bed forming-gas is higher at the time of passing through the drying section 30a than at the time of passing through the drying section 20a. Therefore, it is convenient that the powder grains having not been dried sufficiently in the drying section 20a are sufficiently dried.

More specifically, the method employed by the fluidized-bed granulation coating device of the present invention, namely, the method in which the dried fluidized-bed forming-gas passes downward to upward and the powder grains are dried while being directed upward to downward against this and descending the drying sections 20a and 30a, is a good one in drying efficiency from the viewpoint of the degree of dryness of the used fluidized-bed forming-gas. In addition, if necessary, the auxiliary gas described above may be introduced into the respective sections.

The powder grains fed into the product discharging section 40a passes through the rotary valve 42 airtightly constituted, and are discharged from a product discharge pipe 43 to the outside. If the product discharge pipe 43 is pipe-connected to, e.g., a product storage tank (not shown) or the like, then the product can be automatically stored.

In the drying section 30a, as described above, since the powder grains having not been dried sufficiently in the drying section 20a are dried, the powder grains insufficiently dried are prevented from going directly to the product discharging section 40a. More specifically, the drying section 30a functions as a short-pass prevention section which prevents the powder grains insufficiently dried from going directly into the product discharging section 40a from the drying section 20a, i.e., prevents a so-called short pass.

Embodiment 3

In this embodiment, a modified example of the partition means will be described. The case where, as a partition means, the partition wire nets 11a, 21a and 31a obtained by making predetermined mesh wire nets each formed in a substantially conical shape are used has been described above. However, a partition means having another configuration may be used.

Figure 3A:
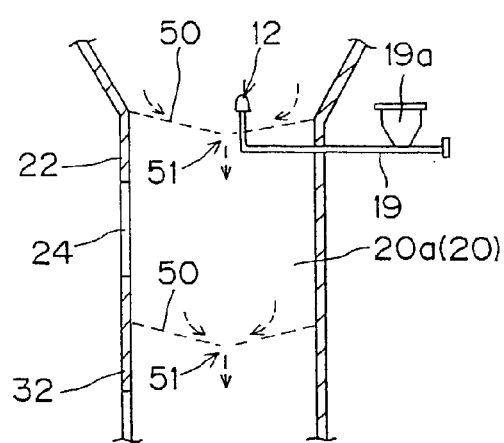
FIG. 3A is a cross-sectional view showing a modified example of a partition means.

For example, as shown in FIG. 3A, a partition wire net 50 (indicated by a broken lines in FIG. 3A) may be formed such that a predetermined mesh wire net is formed in an inverted conical shape and a falling port 51 in which the granulated powder grains fall is provided at the center thereof. Pneumatic classification using the fluidized-bed forming-gas is made at the falling port 51.

Figure 3B:
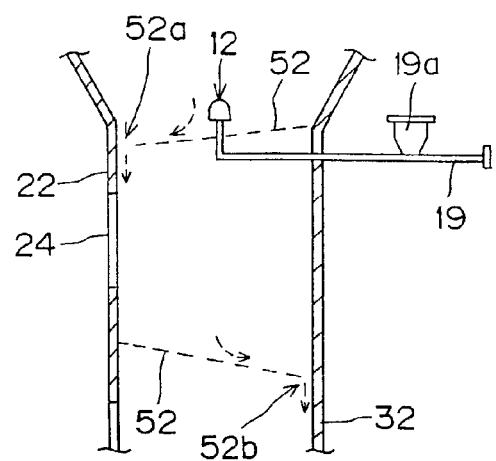
FIG. 3B is a cross-sectional view showing a modified example of a partition means.

In the case shown in FIG. 3B, a partition wire net 52 (indicated by a broken lines in FIG. 3B) obtained by making a predetermined mesh wire net formed in a plate shape may be constituted to have such an inclination that the granulated powder grains roll along and fall on the wire net surface. By providing slits 52a and 52b in the end sides of the partition wire net 52, pneumatic classification using a fluidized-bed forming-gas may be made. In particular, in the case shown in FIG. 3B, positions at which the slits 52a and 52b are formed are vertically different from each other, whereby the powder grains are prevented from going directly to the upper and lower slits 52a and 52b.

Figure 3C:
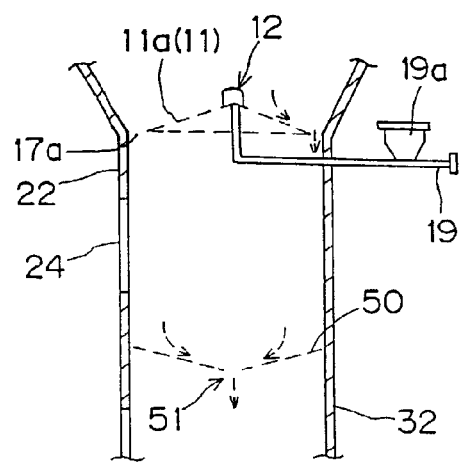
FIG. 3C is a cross-sectional view showing a modified example of a partition means.

In the case shown in FIG. 3C, the partition wire net 11a shown in FIG. 1 and the partition wire net 50 described in FIG. 3A are used at once. In such configuration, pneumatic classification at the time of moving from the granulation coating stage 10a to the drying stage 20a is made by the fluidized-bed forming-gas at the slit 18a, similarly to the above-mentioned description.

Embodiment 4

This embodiment is constituted such that, unlike the configuration shown in FIG. 1, a powder grain passing port for making pneumatic classification is not formed as a slit and communicates with a powder grain moving path 53 coupled between the functional sections connected vertically and pneumatic classification is made by a fluidized-bed forming-gas fed into the powder grain moving path 53.

Figure 4:
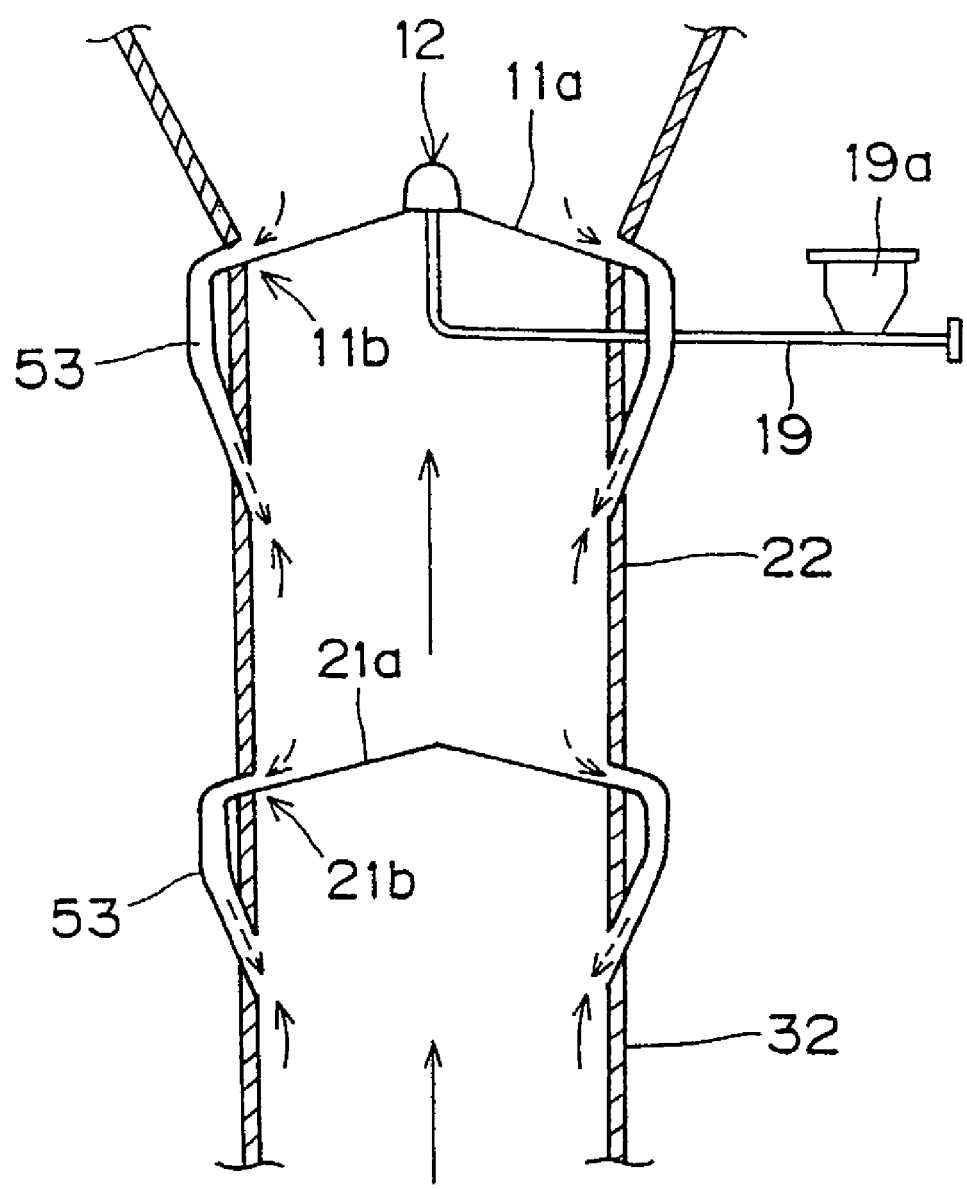
FIG. 4 is a cross-sectional view showing the configuration of a powder-grain moving path.

As shown in FIG. 4, the large-diameter portions 11*b* and 21*b* of the partition wire nets 11*a* and 21*a* are respectively connected to the inner circumferential surfaces of the cylinders 22 and 32 without interposing gaps therebetween. The powder grain moving paths 53 which are opened toward the outsides of the cylinders 22 and 32 and which communicate with the interiors of the lower function stages from these openings are provided at the connection portions between the large-diameter portions 11*b* and 21*b* and the cylinders 22 and 32. A movable fin (not shown) is provided near the lower opening of the powder grain moving path 53 to control a flow rate of the fluidized-bed forming-gas fed into a side of the powder grain moving path 53, whereby pneumatic classification may be controlled.

Figure 5:
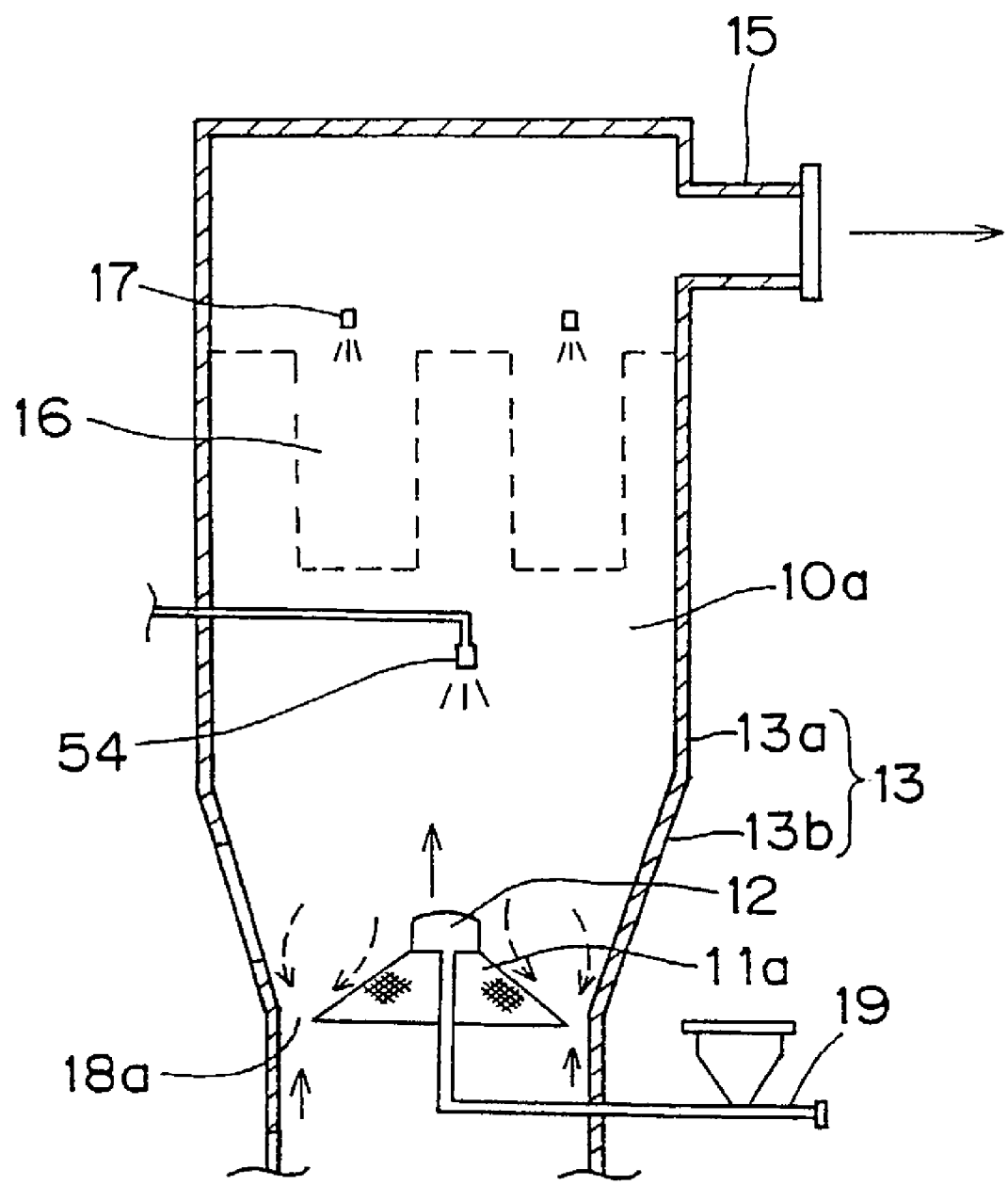
FIG. 5 is a cross-sectional view showing a modified example of a granulating section.

The present invention is not limited to the above-mentioned embodiment and may be changed without departing from the gist thereof as occasion demands For example, the case where the spray nozzle 12 having a 3-fluid nozzle is provided has been described above. As shown in FIG. 5, however, a spray nozzle 54 having a 2-fluid nozzle for humidification and the like may be provided above the spray nozzle 12 and below the bug filter 16.

The case where one drying section is partitioned into two sections that are continuous and vertical to each other has been described above. However, if the powder grains can be sufficiently dried, the drying section may be used as one section. In the case of employing such configuration, by making moveable the partition wire net partitioning the lower product discharging section and the drying section located thereon, the movable partition wire net is periodically moved, whereby moving gaps for the powder grains may be formed. In this manner, a short pass can be effectively suppressed in comparison with the case where a slit or the like constituted as a powder grain passing port is always opened.

In the above description, the configuration of the fluidized-bed granulation coating process is shown in which the granulating section, the drying section, the drying section (short-pass prevention section), and the product discharging section are vertically provided in order of each section directed downward from the uppermost section. However, in addition to this, the fluidized-bed granulation coating process may be constituted in order of variously combined steps such as granulating sections (coating section and drying section), a product discharging section and the like, for example, in order of a granulating section, a drying section, a coating section, a drying section and a product discharging section; in order of a granulation coating section, a drying section and a product discharging section; or in order of a first granulating step section, a second granulating step section, a drying section and a product discharging section.

Further, in the constitution obtained by the variously combined steps described above, when the device is actually operated, the function of a section having an appropriately unnecessary step function may be stopped depending on a product to merely pass through such section.

In the above-mentioned description, the classification is described as a pneumatic classification means that uses a fluidized-bed forming-gas at the slit 18*a*. However, if possible, another classification means may be used.

The case where the spray nozzle is provided in the uppermost section has been described above. However, a plurality of spray nozzles may be provided in a plurality of sections that are vertically partitioned. In this configuration, for example, a material and a binder can be fed by the upper spray nozzle and be granulated, and a coating solution can also supplied by the lower spray nozzle. In the case of using a plurality of coating solutions, spray nozzles are preferably provided in different sections corresponding to the respective coating solutions.

Embodiment 5

Figure 6:
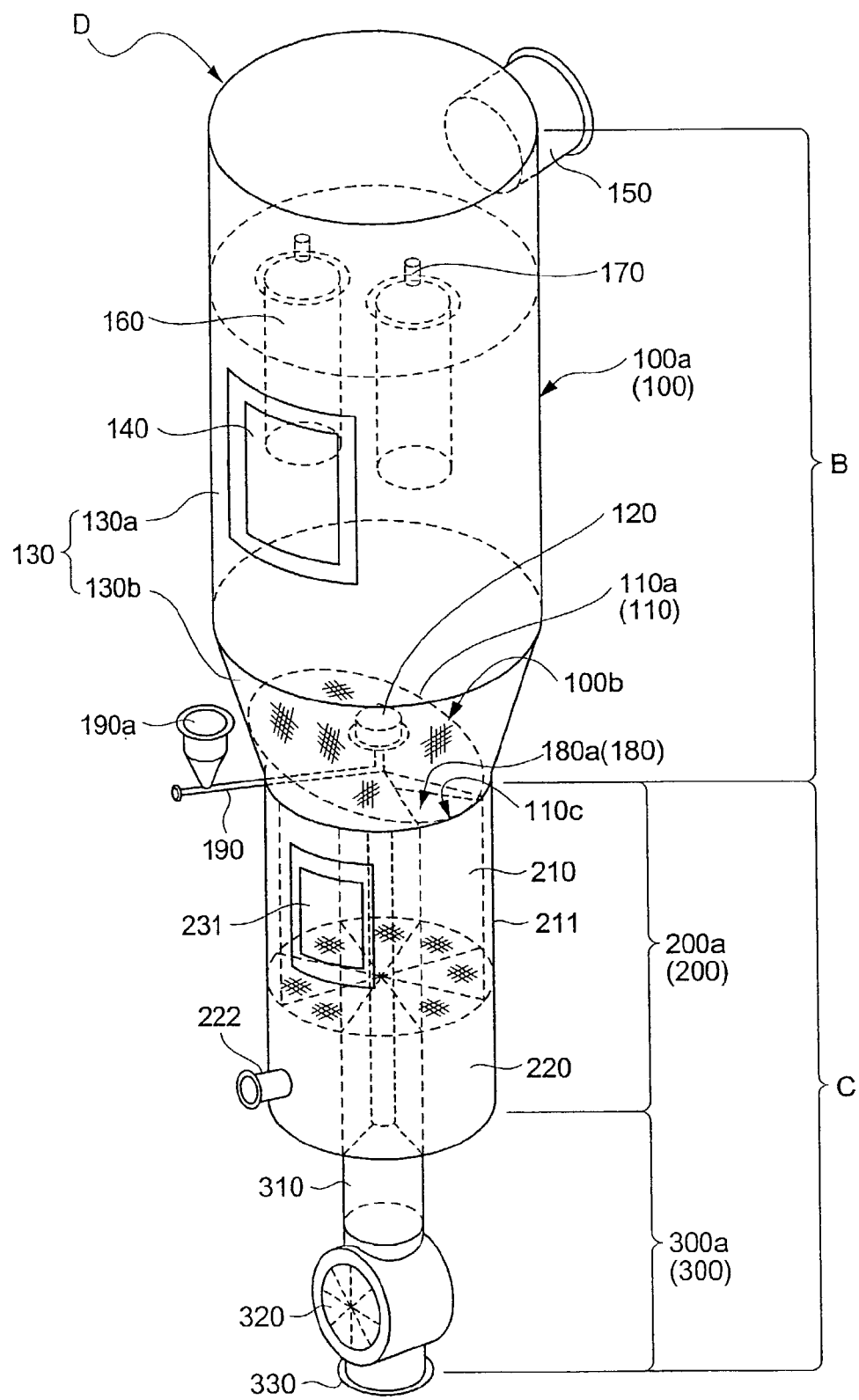
FIG. 6 is a perspective view of a fluidized-bed granulation coating device showing a configuration in which a rotational drying chamber is provided in a drying section.
Figure 7:
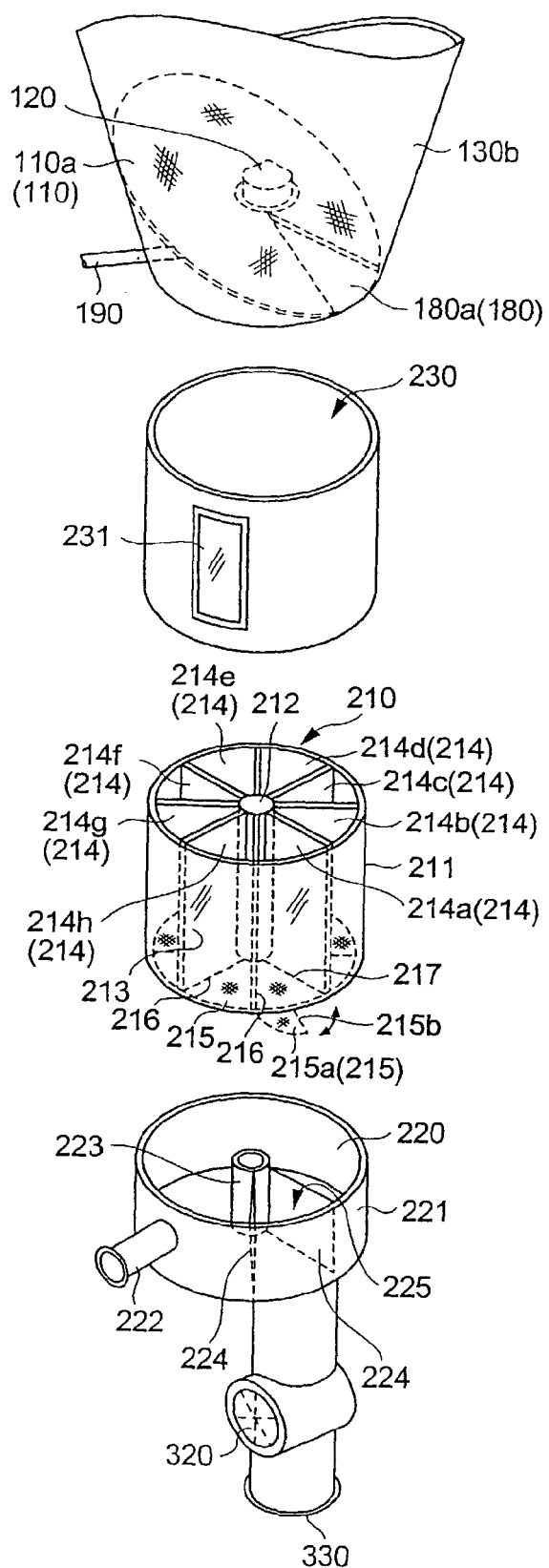
FIG. 7 is a partially exploded perspective view of a fluidized-bed granulation coating device provided with a rotational drying chamber in a drying section.

In this embodiment, the drying section constituting the small-diameter cylinder portion C of the fluidized-bed granulation coating device described in the above-mentioned embodiments 1 to 4 is constituted to use a batch method and a continuous method at once. FIG. 6 is a perspective view of a fluidized-bed granulation coating device of this embodiment. FIG. 7 is an exploded perspective view showing the configuration of a drying section in the fluidized-bed granulation coating device shown in FIG. 6.

A fluidized-bed granulation coating device has, as shown in FIG. 6, a main body D comprising a large-diameter cylinder portion B and a small-diameter cylinder portion C, each of which is formed in a straightly cylindrical shape and is formed in a substantially vertical cylinder, i.e., is of a straight cylinder type. The interior of the cylinder of the main body D is sequentially partitioned vertically into a plurality of sections 100, 200 and 300.

The large-diameter cylinder portion B and the small-diameter cylinder portion C, i.e., the section 100 constituting the large-diameter cylinder portion B and the section 200 corresponding to the upper section of the small-diameter cylinder portion C, are partitioned by a partition means 110 constituted as a partition wire net 110*a* formed of a predetermined mesh.

The section 100 is provided with a spray nozzle 120 therein and is constituted as a granulating section 100*a* having a granulating function of a fluidized-bed granulating process. The granulating section 100*a* (100) is formed in the large-diameter cylinder portion B. The large-diameter cylinder portion B is constituted by a cylinder 130 comprising: a straight cylindrical portion 130*a* whose an upper end is closed; and a lower cylindrical portion 130*b* which is provided continuously under the straight cylindrical portion 130*a* and which is taped downward. An observation hatch 140 is provided in the side surface of the straight cylinder portion 130*a*, so that a granulating state can be checked therethrough. An exhaust pipe 150 communicating with the outside from the interior of the cylinder is provided, as an exhaust means of a fluidized-bed forming-gas, in the upper side surface of the straight cylinder portion 130*a*.

Further, in the straight cylinder portion 130*a*, as shown in FIG. 6, bug filters 160 are provided. A pulse jet nozzle 170 for preventing each bug filter 160 from clogging is provided at the upper portion of each bug filter 160. Note that, as a means for preventing each bug filter 160 from clogging, a shaking means may be employed.

Additionally, a partition wire net 110*a*, partitioning the section 100 of the large-diameter cylinder portion B and the section 200 of the small-diameter cylinder portion C having the above-mentioned configuration as constituted above, is formed in a plane shape by a predetermined mesh wire net. In a wire net surface 110*b*, as shown in FIG. 6, a notch 180*a* formed in a substantial triangular shape is provided as a powder grain passing means 180.

The partition wire net 110*a* is provided so that a bottom corresponding portion 110*c* of the notch 180*a* comes to the lowermost position on the inclined plane of the wire net surface 110*b* provided aslant, namely, comes to the joint position between the lower cylindrical portion 130b and the small-diameter cylinder portion C. The partition wire net 110a is also provided in the lower cylindrical portion 130b so that the entire wire net surface 110b is inclined. The powder grains, granulated in the granulating section 100a and each having a predetermined weight, fall on the wire net surface 110b against the fluidized-bed forming-gas passing downward to upward through the partition wire net 110a, thereby rolling on the wire net surface 110b to fall into a lower drying section 200a from the notch 180a.

In the cylinder of the lower cylindrical portion 130b, a material supply pipe 190 is coupled to the outside through the sidewall thereof. The spray nozzle 120 described above is provided at the tip of the material supply pipe 190. The spray nozzle 120 projects, into the granulating section 100a, from the central position of the wire net surface 110b of the partition wire net 110a aslant mounted.

A material supply hopper 190a is connected to the material supply pipe 190 on the way. The pipe end of the material supply pipe 190, although not shown, is connected to a supply source of a solution such as a binder or the like, so that the binder and powder grains can be spouted from the spray nozzle 120 together with a pressure gas. In this case, the spray nozzle 120 may be constituted as a 3-fluid nozzle.

Further, the small-diameter cylinder portion C partitioned from the large-diameter cylinder portion B by the partition wire net 110a is, as described above, divided into a drying section 200a and a product discharging section 300a in order from above. The drying section 200a (200) comprises: a rotational drying chamber 210 whose an upper portion is partitioned immediately under the granulating section 100a through the partition wire net 110a; and a blowing chamber 220 provided under the rotational drying chamber 210.

The rotational drying chamber 210 is rotatably accommodated, as shown in the exploded perspective view of FIG. 7, in a cylinder 230 connected to the lower cylindrical portion 130b constituting the granulating section 100a. In the case of being shown in FIG. 7, the rotational drying chamber 210 is constituted so that a plurality of spaces for drying are partitioned in the cylindrical space surrounded by a cylindrical frame 211 formed of a transparent material. More specifically, partition walls 213 are radiately provided toward the cylindrical frame 211 from a rotating shaft cover 212 provided at the central position in the cylindrical space. A plurality of drying chambers 214 are provided at the central position of the rotational drying chamber 210, i.e., the radial positions relative to the rotating shaft cover 212.

The plurality of drying chambers 214, as shown in FIG. 7, are equal to one another in size, shape and the like. A powder grain receiving port of each upper portion of the drying chambers 214 is formed in an open state. In each of openings serving as granular discharge ports in the respective bottom surface sides of the drying chambers 214, a predetermined mesh partition wire net 215a through which the fluidized-bed forming-gas can pass but the powder grains accommodated in the drying chambers 214 cannot pass is provided to be able to open and close as a partition means 215 partitioning the lower section and each drying chamber 214.

As an opening/closing mechanism of each partition wire net 215a, for example, the following configuration is considered. A frame portion 216 which supports each partition wire net 215a is formed as a rotating shaft, and each partition wire net 215a provided on the frame portion 216 is rotated about the frame portion 216 by a biasing means such as a spring or the like, whereby the bottom opening of each drying chamber 214 comes to a closed state.

Meanwhile, each electromagnet (not shown) is provided in a side of a frame portion 217 opposite to the frame portion 216 and on a contact portion 215b that is in contact with the frame portion 217 of the partition wire net 215a in a closed state thereof. By carrying an electric current into both electromagnets at the time of an open state thereof, the respective electromagnets provided on the frame portion 217 and the contact portion 215b are repelled mutually, whereby each partition wire net 215a is opened against the biasing force generated by the spring.

The above-mentioned opening/closing mechanism is shown by way of example only and is not limited to the above configuration. In short, a conventional mechanism, which can open/close each partition wire net 215a without generating spark or the like which causes dust explosion, may be employed.

Further, an observation hatch 231 is provided in the side surface of the cylinder 230 rotatably accommodating the rotational drying chamber 210 having the above-mentioned configuration, so that drying states of the powder grains in each of the drying chambers 214 constituting the rotational drying chamber 210 can be visually checked through the cylindrical frame 211 formed of the transparent material.

A blowing chamber 220 provided under the rotational drying chamber 210 is, as shown in FIG. 7, constituted in a space surrounded by a cylindrical frame 221. The blowing chamber 220 whose an upper side is opened is connected to the lower portion of the cylinder 230 covering the rotational drying chamber 210.

In the cylindrical frame 221 of the blowing chamber 220, a gas-supply pipe 222 is provided, so that the fluidized-bed forming-gas can be supplied into the chamber through the gas-supply pipe 222. Further, a rotating shaft cover 223 is provided at the central position in the chamber. Respective partition walls 224 are radially provided from such rotating shaft cover 223 toward the cylindrical frame 221. A powder grain path 225 that is isolated by each partition wall 224 and into which the fluidized-bed forming-gas is not supplied is provided to vertically penetrate the chamber.

The upper opening of the powder grain path 225 is provided at a position offset from the opening position of the notch 180a of the partition wire net 110a. In the case of being shown in FIG. 7, respective positions are set to counterclockwise arrange the installation position of the powder grain path 225 and the forming position of the notch 180a in this order, such that the un-dried powder grains do not go directly to the powder grain path 225 from the notch 180a.

The upper opening of the powder grain path 225 is formed to correspond to the opening shape of each bottom side of the plurality of drying chambers 214 constituting the rotational drying chamber 210. For this reason, while each partition wire net 215a in the bottom surface sides of the drying chambers 214 is opened, the powder grains can be certainly dropped from the drying chambers 214 into the powder grain path 225. The upper opening shape of such powder grain path 225 is not limited to the shape of the above-mentioned configuration. Such a shape as to be certainly capable of dropping, into the powder grain path 225, the powder grains in the drying chambers 214 for a short period of time may be other than the shape of the above-mentioned configuration.

The lower portion in the chamber of the blowing chamber 220 is constituted so that it is closed except for the portion corresponding to the above-mentioned powder grain path 225 and the fluidized-bed forming-gas supplied into the chamber can upward pass through the chamber. The lower portion of the powder grain path 225 is formed in an opened state and communicates with a cylinder 310 constituting a product discharging section 300a. Under the cylinder 310 are provided a rotary valve 320 communicating with the cylinder 310 and serving as a product discharge means, and a product discharge pipe 330 communicating with the rotary valve 320.

The fluidized-bed granulation coating device having the above-mentioned configuration is used as follows. The gas-supply pipe 222 of the blowing chamber 220 provided at the lower portion of the main body D is connected to a supply source for a fluidized-bed forming-gas. The exhaust pipe 150 of the granulating section 100 provided at the upper portion thereof is connected to a suction source and is sucked. By doing so, the dried fluidized-bed forming-gas is introduced into the blowing chamber 220 from the gas-supply pipe 222.

The fluidized-bed forming-gas fed into the blowing chamber 220 upward passes through the chamber and is introduced into the drying section 200a. More specifically, the fluidized-bed forming-gas upward passes each interior of the drying chambers 214, through each wire net 215a provided on the bottom surface of each drying chamber 214, from the lower portion of the rotational drying chamber 210 rotating in the cylinder 230. The fluidized-bed forming-gas passing downward to upward through the respective drying chambers 214 is introduced into the granulating section 100a provided on the drying section 200a. The fluidized-bed forming-gas introduced into the granulating section 100a is sucked through the exhaust pipe 150 and is exhausted to the outside. Thus, the fluidized-bed forming-gas pass downward to upward the plurality of sections 200 and 100 partitioning the interior of the cylinder of the main body D into an upper and lower portions.

Further, while the fluidized-bed forming-gas passes downward to upward the drying section 200a (200) and the granulating section 100a (100), material powder grains and a binder are supplied into the granulating section 100a through the material supply pipe 190. The powder grains and the binder are upward spouted from the spray nozzle 120 into the granulating section 100a.

The spouted powder grains and binder come to a fluidized-bed state in the cylinder 130 by the fluidized-bed forming-gas. The powder grains are bound to one another through the binder, whereby particles each having a predetermined weight are granulated. The granulated powder grains are pneumatic classified by the fluidized-bed forming-gas. More specifically, powder grains each having a weight smaller than the predetermined weight are flied high by the fluidized-bed forming-gas and is used for granulation, and powder grains each having a weight reaching the predetermined weight fall against the upward wind force of the fluidized-bed forming-gas by gravity due to their own weights and are classified.

The granulated powder grains each having the predetermined weight fall against the fluidized-bed forming-gas as described above, and fall, e.g., on the partition wire net 110a in the granulating section 100a. The wire net surface 110b of the partition wire net 110a is aslant provided, so that the powder grains falling on the partition wire net 110a roll along and fall on the wire net surface 110b of the partition wire net 110a and are sent from the notch 180a, into the drying chambers 214 of the rotational drying chamber 210 rotatably provided in the drying section 200a.

The plurality of drying chambers 214 of the rotational drying chamber 210 are rotated together with the rotating shaft cover 212 which rotated by a rotating shaft (not shown) rotatably constituted by a motor (not shown) serving as a drying chamber drive means. For example, the motor may be provided below or under the blowing chamber 220, and the rotating shaft rotatably constituted by such motor may be transmitted through the rotating shaft cover 223 in the blowing chamber 220 and the rotating shaft cover 212 of the rotational drying chamber 210, so that the rotating shaft cover 212 can be rotated by the rotation of the rotating shaft. As the motor, a motor subjected to stepping control may be used, the stepping control motor repeating stop for a predetermined period of time when being rotated up to a predetermined rotational angle, and then rotation up to the predetermined rotational angle again.

Next, supply of the powder grains from the granulating section 100a to the drying section 214, drying of the powder grains in the drying chambers 214, and discharge of the dried powder grains from the drying chambers 214 to the product discharging section 300a will be described. For descriptive convenience, the plurality of drying chambers 214, as shown in FIG. 7, may be referred to as reference numerals 214a, 214b, 214c, 214d, 214e, 214f, 214g and 214h.

The drying chamber 214a (214) of the rotational drying chamber 210 is stopped so that the upper opening thereof is positioned at the place located immediately under or below the notch 180a of the partition wire net 110a (this position may be simply called a powder grain supply position hereinafter). Under this situation, the powder grains, which are granulated in the granulating section 100a to come to a granulating state and to each have a predetermined weight, fall on the partition wire net 110a against the upward wind force of the fluidized-bed forming-gas. The falling powder grains roll on the wire net surface 110b and fall from the notch 180a into the drying chamber 214a located immediately under the notch 180a, i.e., stopped at the powder grains supply position.

After stopping for a predetermined period of time, the rotational drying chamber 210 rotates by one step, whereby the drying chamber 214a rotates up to a position where the drying chamber 214b adjacent thereto along the rotational direction has been stopped. Since the rotational drying chamber 210 rotates by one step as described above, the other drying chambers 214b, 214c, 214d, 214e, 214f, 214g and 214h rotate up to respective adjacent positions as a matter of course.

Since the drying chamber 214a into which the un-dried powder grains are supplied rotates by one step as described above, the drying chamber 214h (214) backward adjacent to the drying chamber 214a is positioned immediately under the notch 180a of the partition wire net 110a, i.e., at the powder grain supply position and is stopped for a predetermined period of time. While the drying chamber 214h is stopping, the un-dried powder grains granulated in the granulating section 100a and each having a predetermined weight are supplied into the drying chamber 214h.

In the meantime, while the powder grains are supplied into the drying chamber 214h in the above manner, the drying chamber 214a accommodating the un-dried powder grains is stopped at a position offset from the powder grain supply position. In the drying chamber 214a, the un-dried powder grains come to a fluidized-bed state due to the fluidized-bed forming-gas passing downward to upward through the partition wire net 215a of the bottom surface thereof, and then are dried.

After the drying chamber 214h is stopped for the predetermined period of time, the rotational drying chamber 210 rotates by one step again and the drying chamber 214g is stopped at the powder grain supply position. The un-dried powder grains granulated in the granulating section 100a and each having the predetermined weight are pneumatic classified against the fluidized-bed forming-gas and are supplied into the drying chamber 214g. Meanwhile, the drying chambers 214a and 214h accommodating the powder grains are respectively stopped at positions offset from the notch 180a, and the un-dried powder grains are dried in the respective chambers by the fluidized-bed forming-gas passing downward to upward through the chambers.

In the same manner as described above, the remaining drying chambers 214f (214), 214e (214), 214d (214), 214c (214) and 214b (214) sequentially rotate step by step and are stopped at the powder grain supply position for the predetermined period of time, and the un-dried powder grain granulated in the granulating section 100a are supplied into the chambers. Until the drying chamber 214b comes at the powder grain supply position, the rotation and stop of the drying chambers 214a, 214h, 214g, 214f, 214e, 214d and 214c are repeated step by step. During this repetition, the powder grains are progressively dried in the chambers by the fluidized-bed forming-gas passing downward to upward through the chambers. In this manner, the rotational drying chamber 210 having the plurality of drying chambers 214 rotates and takes a round.

When the rotational drying chamber 210 rotates step by step and the drying chamber 214b located at the position forward adjacent to the drying chamber 214a comes to the powder grain supply position, the drying chamber 214a located at the position backward adjacent to the drying chamber 214b is stopped at the position located immediately on the powder grain path 225 provided in the blowing chamber 220 (this position may be simply referred to as a powder grain discharge position hereinafter).

Under such situation, while the powder grains are supplied into the drying chamber 214b in the same manner as described above, the partition wire net 215a provided in the bottom surface thereof is opened in the drying chamber 214a and the dried powder grains accommodated in the drying chamber 214a are discharged into the powder grain path 225 at a breath. Since the discharge of the powder grains is forced to open the lower portion of the drying chamber 214a and is made at a breath by gravity, this discharge is completed for a very short period of time. After the discharge, the partition wire net 215a is returned to a closed state.

For example, if the closing/opening mechanism of the partition wire net 215a has the above-mentioned configuration, when an electric current is carried at the opening of the partition wire net 215a, the partition wire net 215a is rotated about the frame portion 216 against the biasing force because of the repulsive force created between the electromagnets provided in both of the frame portion 217 and the contact portion 215b, thereby being opened. After the discharge of the powder grains is completed, when carrying the electric current is stopped, the repulsive force between the electromagnets is dissolved and the partition wire net 215a is rotated about the frame portion 216 by the biasing force of the spring, thereby coming to a closed state.

Thus, each time the rotational drying chamber 210 repeats rotation and stop step by step, the un-dried powder grains granulated in the granulating section 100a are supplied into the drying chambers 214 each stopped at the powder grain supply position. The sufficiently dried powder grains are discharged from the drying chambers 214 each stopped at the powder grain discharge position, into the powder grain path 225. In addition to this, in the drying chambers 214 each located in the halfway range from the powder grain supply position to the powder grain discharge position, the un-dried powder grains in the chambers are dried in a fluidized-bed state by the fluidized-bed forming-gas.

More specifically, in the rotational drying chamber 210 having the above-mentioned configuration, supply of the un-dried powder grains into the drying chambers 214, drying of the supplied and un-dried powder grains in the drying chambers 214, and discharge of the dried powder grains from the drying chambers 214 are made by a batch method in any of the plurality of drying chambers 214 rotated step by step and, at the same time, are continuously made.

The dried powder grains discharged into the powder grain path 225 are directly supplied into the product discharging section 300a through the cylinder 310 communicating with the powder grain path 225, and are discharged from the product discharge pipe 330 to the outside through the rotary valve 320 which is air-tightly constituted. If the product discharge pipe 330 is pipe-connected to, e.g., a product storage tank (not shown) or the like, then storage of products can be automatically made.

In this embodiment, as the configuration of the drying section 200a, the rotational drying chamber 210 having the plurality of drying chambers 214 is provided, and so the powder grains are sufficiently dried while each drying chamber 214 circulates from the powder grain supply position to the powder grain discharge position. Further, since the plurality of drying chambers 214 are provided, in comparison with the case of drying lots of un-dried powder grains in one large drying chamber, the powder grains are subdivided in the drying chambers 214, thereby being dispersed. Therefore, amounts handled in each drying chambers 214 can be suppressed small, and so the sufficient drying can be made by a batch method and continuously made at the same time.

Figure 8:
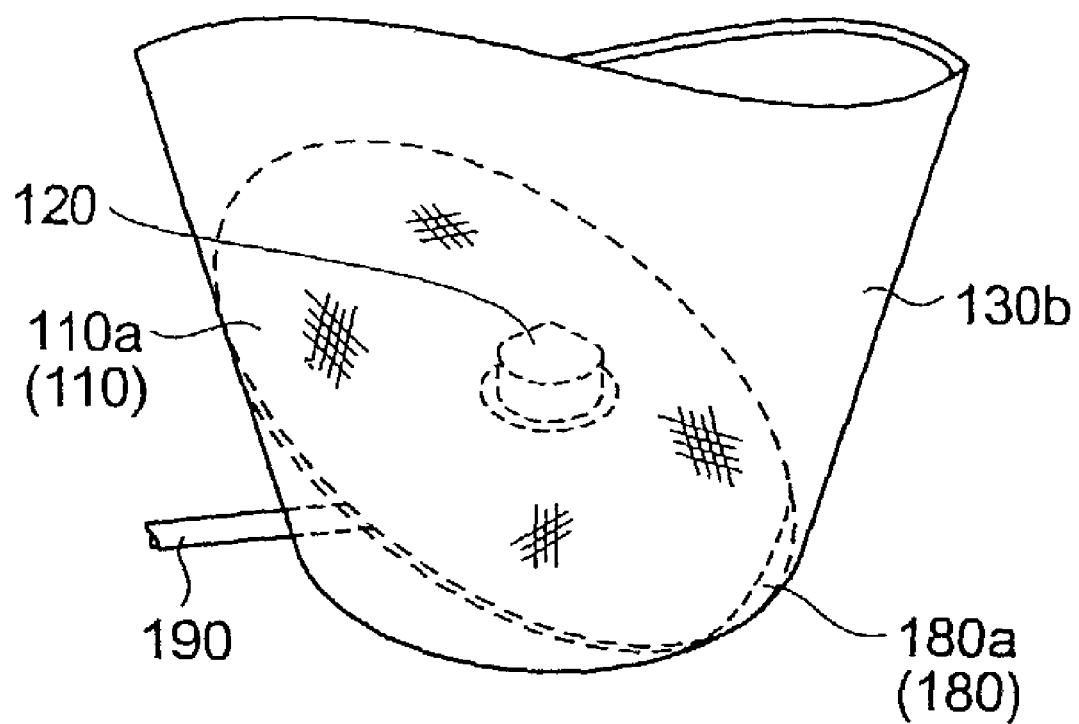
FIG. 8 is a partial perspective view showing a modified example of a partition wire net.

In Embodiment 5, the description has been made of the case where the notch 180a having a substantially rectangular shape is formed as the powder grain passing means 180 on the partition wire net 110a aslant provided in the lower cylindrical portion 130b. However, as shown in FIG. 8, the notch may be formed in the side in which the net surface 110b of the partition wire net 110a is in contact with the connection position of the large-diameter cylinder portion B and the small-diameter cylinder portion and is formed like a slit having such a size that the powder grains can fall.

Figure 9A:
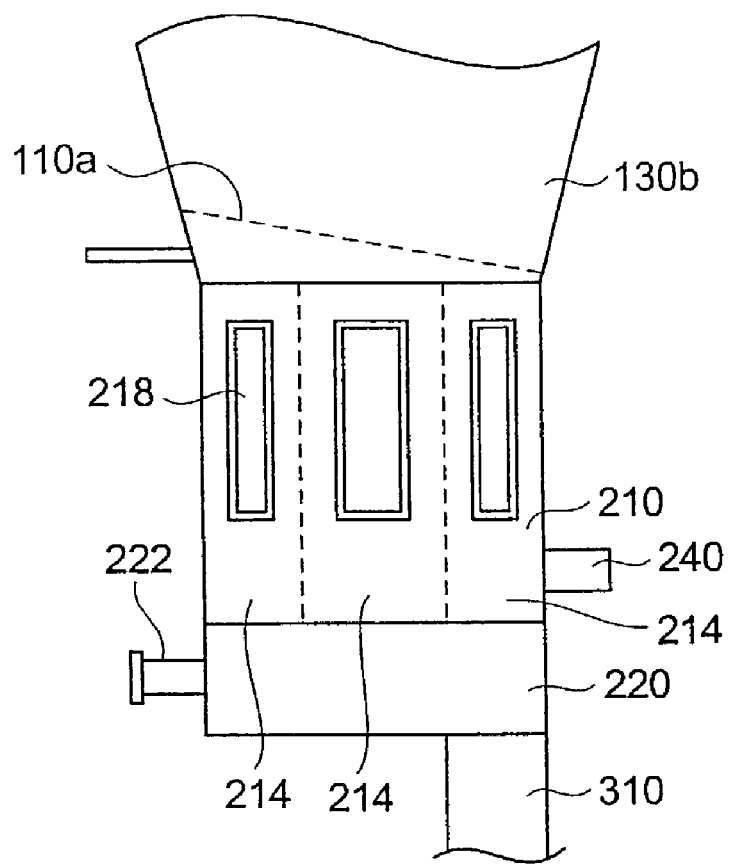
FIG. 9A is a partial side view showing a modified example of a rotating mechanism of a rotational drying chamber.

Further, the case where the rotational drying chamber 210 is axially and rotatably provided in the cylinder 230 has been described. However, as shown in FIG. 9A, another rotating mechanism using rotation other than the axial rotation may be employed. For example, the rotational drying chamber 210 may be rotatably provided between the lower cylindrical portion 130b and the blowing chamber 220, without providing the cylinder 230. Under this situation, a rotational body 240 is brought into contact with the side surface of the cylindrical frame 211 constituting the rotational drying chamber 210 through abutment or engagement of gears or the like and the rotational body 240 may be rotated, whereby the rotational drying chamber 210 may be rotated. The rotational body 240 is subject to step rotation control by a motor or the like.

Figure 9B:
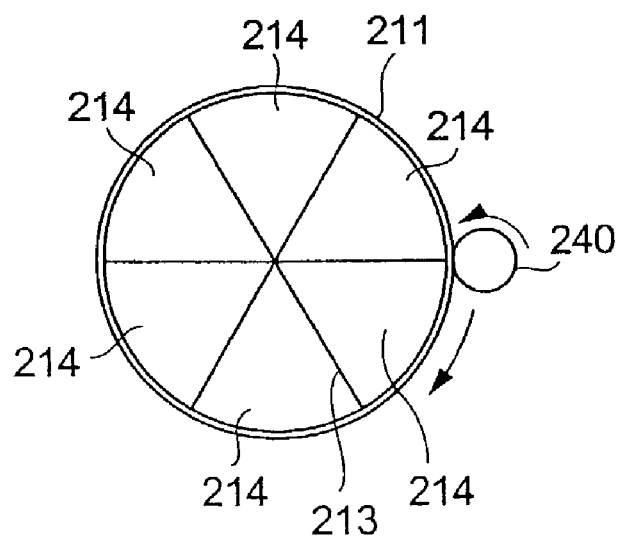
FIG. 9B is a plan sectional view thereof.

The cylindrical frame 211 formed of a material such as metal or the like, and observation hatches 218 may be formed in the drying chambers 214, respectively. In such configuration, as shown in FIG. 9B, a space for a rotating shaft passing through the center in the chamber of the rotational drying chamber 210 is unnecessary, and so a space for each drying chamber 214 can be made large.

Moreover, the configuration in which the notch 180a of the partition wire net 110a is always opened has been described above. However, an openable/closable lid may be provided. By employing such configuration, the supply of powder grains into the drying chambers 214 can be made only in the state in which each drying chamber 214 is stopped at the powder grain supply position.

In the configuration in which the notch 180a is always opened, the powder grains are supplied while the drying chambers 214 rotate. For example, when the boundary between two adjacent drying chambers 214 is close to the range of the notch 180a, the powder grains are supplied into both drying chambers 214. In the case where an amount of powder grains passing through the notch 180a, a rotating speed and a stop time of each drying chamber 214, and the like are controlled to be almost constant, even in this supply state, there arises no problem of causing the qualitative difference in a final drying state.

However, if an openable/closable lid is provided, for example in the configuration shown in FIG. 7, only four drying chambers 214a, 214c, 214e and 214g of the plurality of drying chambers 214 can be also used alternately. By keeping each lid in a closed state, the powder grains cannot be supplied into the drying chambers 214b, 214d, 214f and 214h.

The drying chambers 214 of the rotational drying chamber 210 may be used, as described above, such that the number of drying chambers 214 used is appropriately selected depending on a manufacturing condition. When powder grains to be easily dried are used, such powder grains can be also coped with by reducing the number of used drying chambers without increasing the rotational speed of each drying chamber. For this reason, the powder grains can be simply coped with by controlling a rotational angle step by step, without providing a gearshift mechanism for the rotational mechanism.

The number of drying chambers 214 constituting the rotational drying chamber 210, as shown in FIGS. 7 and 9, is not limited to eight or six, and a plurality of drying chambers 214 including at least three may be provided.

Figure 10A:
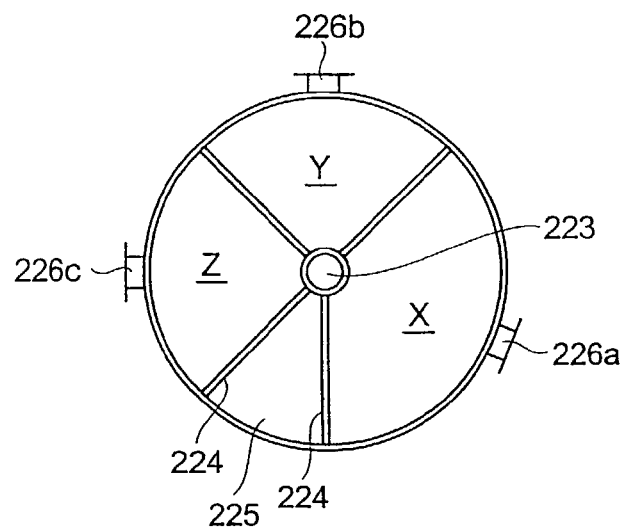
FIG. 10A is a plan explanatory diagram showing a configuration in which the interior of a blowing chamber is partitioned into a plurality of sections.

Further, the blowing chamber 220 in FIGS. 6 and 7 shows the case where the space except for the powder grain path 225 is constituted as one chamber. However, as shown in FIG. 10A, in the chamber 220, gas-supply pipes 226a, 226b and 226c may be provided such that the interior of the chamber except for the powder grain path 225 is partitioned into a plurality of sections X, Y and Z and the flow rates of the fluidized-bed forming-gases in the respective sections X, Y and Z are different from one another. The flow rates of the fluidized-bed forming-gases may be controlled, for example, so as to lessen in order of the gas-supply pipe 226a>the gas-supply pipe 226b>the gas-supply pipe 226c.

Figure 10B:
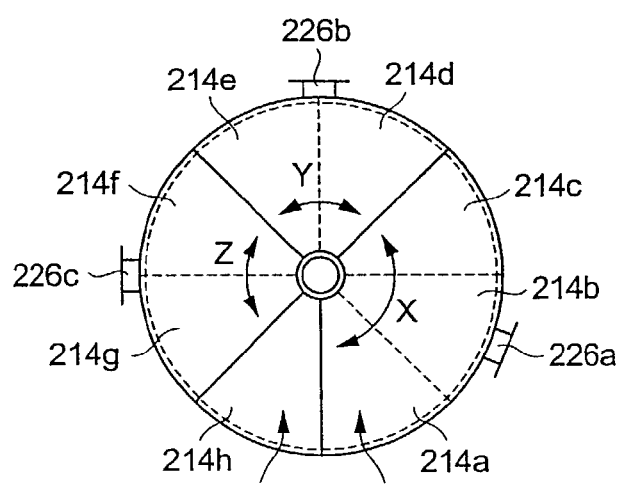
FIG. 10B is a plan explanatory diagram showing a manner in which a plurality of drying chambers is arranged on the blowing chamber in FIG. 10A.

FIG. 10B shows the state in which the respective drying chambers 214a to 214h of the rotational drying chamber 210 overlap with the blowing chamber 220 having the above-mentioned configuration. While the drying chamber 214a is stopped at the powder grain supply position, the drying chambers 214a, 214b and 214c are stopped on the section X of the blowing chamber 220 and the fluidized-bed forming-gas supplied from the gas-supply pipe 226a passes upward through the respective drying chambers 214a, 214b and 214c.

In the drying chamber 214a, the wet powder grains granulated in the granulating section 100a are supplied into the chamber, against the fluidized-bed forming-gas passing upward. In the drying chamber 214b, the un-dried powder grains supplied on the previous stage are subjected to a drying process by the fluidized-bed forming-gas. In the drying chamber 214c, the powder grains somewhat dried on the stage of the drying chamber 214b are further subjected to a drying process. In the drying chambers 214a, 214b and 214c, the powder grains are relatively heavy in weight because they reach no sufficiently dried state, and so the fluidized-bed state thereof can be ensured by supplying the fluidized-bed forming-gas at a high flow rate.

The drying chambers 214d and 214e are stopped on the section Y of the blowing chamber 220, and a drying process of the powder grains that have not been sufficiently dried is performed by the fluidized-bed forming-gas supplied from the gas-supply pipe 226b. The flow rate of the fluidized-bed forming-gas from the gas-supply pipe 226b is made lower than that of the fluidized-bed forming-gas from the gas-supply pipe 226a, thereby being capable of keeping proper the fluidized-bed state of dried powder grains smaller in weight than the powder grains accommodated in the drying chambers 214a, 214b and 214c.

The drying chambers 214f and 214g are stopped on the section Z of the blowing chamber 220, and a sufficient drying process of the powder grains is performed by the fluidized-bed forming-gas supplied from the gas-supply pipe 226c. The flow rate of the fluidized-bed forming-gas from the gas-supply pipe 226c is made much smaller than that of the fluidized-bed forming-gas from the gas-supply pipe 226b, thereby being capable of keeping further proper the fluidized-bed state of the dried powder grains far smaller in weight than the powder grains accommodated in the drying chambers 214d and 214e.

In the above-mentioned description, the interior of the blowing chamber 220 is divided into the three sections X, Y and Z, but may be divided into two sections or more. In addition, even though the number of sections thereof is the same, the number of drying chambers to be provided in the same section may be changed. More specifically, the number of sections and the number of drying chambers to be provided in each section need not be limited to the configuration shown in FIG. 10 and may be appropriately set as occasion demands.

Figure 11:
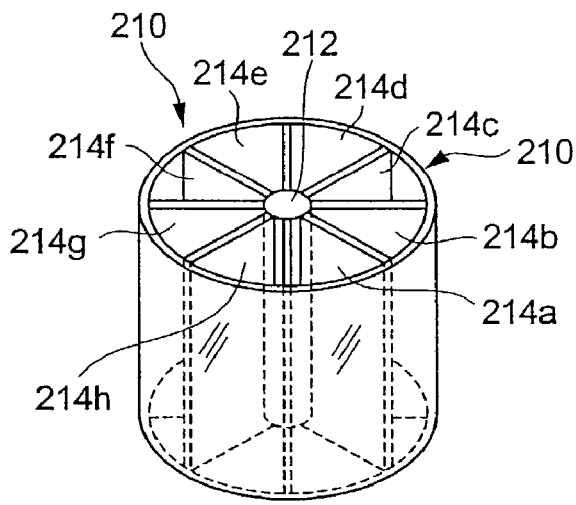
FIG. 11 is a partially exploded perspective view showing a modified example of a configuration in which the bottoms of respective drying chambers of the rotational drying chamber are omitted.
Figure 11:
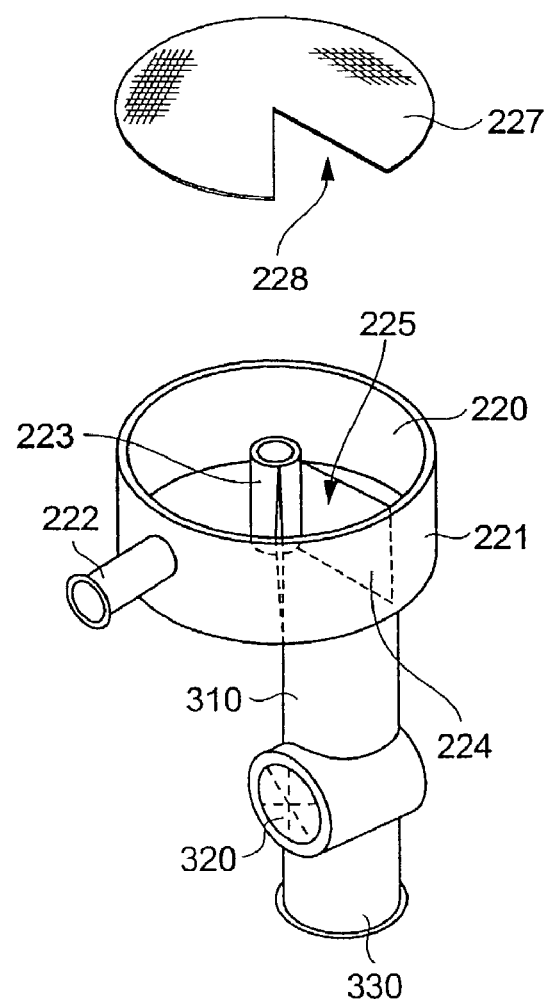

The above-mentioned description shows the configuration in which the openable/closable partition wire net 215a is provided in the bottom surface opening of each drying chamber 214 of the rotational drying chamber 210. However, as shown in FIG. 11, it is also possible to employ such a configuration that the partition wire net 215a is not provided in each drying chamber 214. FIG. 11 shows both configurative parts of the rotational drying chamber 210 of the drying section 200a and the product discharge section 300a in the exploded perspective view shown in FIG. 7.

In the configuration shown in FIG. 11, because of the accommodation of the rotational drying chamber 210 in the cylinder 230, and the like, the rotational drying chamber 210 has the same configuration as that shown in FIG. 7 except the fact that the partition wire net 215a is not provided on each bottom opening side of the drying chambers 214 constituting the rotational drying chamber 210. As shown in FIG. 11, a partition wire net 227 is provided on the upper opening of the blowing chamber 220, and a notch 228 is provided in the partition wire net 227 in accordance with the powder grain path 225.

The rotational drying chamber 210 constituted by the plurality of drying chambers 214 each formed in a bottomless shape is rotatably provided on the partition wire net 227 having such configuration. By rotating the drying chambers 214, the powder grains fall into the powder grain path 225, from the interior of the drying chamber 214 having come to the upper portion of the notch 228. Therefore, it is possible to make simpler such configuration without providing the openable/closable partition wire net 215a in the bottom opening of each drying chamber 214. However, this configuration is applied to the granulation of powder grains each having sufficiently large a particle size for the powder grains not to get caught in the gap(s) between the moving partition wall 213 and the partition wire net 227 when the drying chamber 214 is rotated.

INDUSTRIAL APPLICABILITY

The fluidized-bed granulation coating device of the present invention has the configuration in which the respective sections are arranged vertically. So, the movement of the respective powder grains between the respective sections is made by falling by gravity due to their own weights, thereby being capable of doing without providing a convey mechanism for powder grains in comparison with the case of horizontally arranging the respective sections, and of achieving a reduction in an area for installing the device. The simpler configuration of the device can also be achieved.

In the fluidized-bed granulation coating device of the present invention, the fluidized-bed forming-gas can be also used for granulation of the powder grains, drying of the granulated powder grains, and pneumatic classification, respectively. Therefore, the configuration of the device can be made simpler in comparison with the case of supplying respective exclusive gases.

The fluidized-bed granulation coating device of the present invention can have the configuration in which the spray nozzle is provided in the upper section such as the uppermost section or the like. Therefore, since the fluidized-bed forming-gas supplied downward to upward becomes a state containing proper humidity in the area where the fluidized-bed forming-gas reaches the granulation coating stage, the supply of the preferable fluidized-bed forming-gas can be achieved in granulating the dried powder grains and so the fluidized-bed granulation coating can be performed more efficiently.

By using the fluidized-bed granulation coating device and the fluidized-bed granulation coating method according to the present invention, since expansion of production scale can be achieved by using a single device, products having the same quality can be obtained regardless of a production scale. Scaling up the device is unnecessary on respective stages of study, trial manufacture and production, and so it is possible to do with hardly changing operation conditions and the like and to facilitate a shift from study to trial manufacture and a shift from trial manufacture to actual production.

In the present invention, since the rotational drying chamber having a plurality of drying chambers is provided in the drying section, the powder grains are sufficiently dried during the circulation from the powder grain supply position to the powder grain discharge position. Further, by providing the plurality of drying chambers, in comparison with the case of being dried in one large drying chamber, the amount of powder grains handled in each drying chamber is dispersed, thereby lessening. Therefore, the powder grains can be easily and sufficiently dried.

In the present invention, since the drying process in each drying chamber is performed by a so-called batch method and each drying chamber rotates, a so-called semi-continuous drying process can be constituted in which the handling of the batch method in each drying chamber is continuously made. Therefore, in comparison with the case where only either of a batch process or a continuous process is performed, one process having the merits of both processes at once can be achieved.

What is claimed is:

1. A fluidized-bed granulation coating device comprising:
 a cylindrical body provided with an exhaust port in an upper direction and a gas supply port in a lower direction, a cylinder direction thereof being divided into the upper and lower directions;
 a partition means partitioning a cylindrical interior of said body into a plurality of sections in the upper and lower directions and passing a fluidized-bed forming-gas flowing from said gas supply port to said exhaust port; and
 a powder train passing means in which powder grains fall by gravity to pass between the sections in the upper to lower direction;
 wherein a spray nozzle is provided in one section or more of said plurality of sections, and a product discharge means is provided in a lower section of said plurality of sections; and
 wherein a drying section is provided between the uppermost section and the lowermost section of the plurality of sections, and said drying section comprises:
 a plurality of drying chambers provided with powder grain receiving ports and powder grain discharge ports, and passing the fluidized-bed forming-gas in the lower to upper direction;
 a drying chamber drive means for moving said powder grain receiving ports of said plurality of drying chambers, in a side of said powder grain passing means provided in the partition means partitioning said drying chambers from the sections located immediately thereon, and for moving said powder grain discharge ports of the plurality of drying chambers, in a side of said powder grain passing means provided in the partition means partitioning said drying chambers from the sections located immediately thereunder; and
 a blowing chamber provided under said drying chambers and supplying said fluidized-bed forming-gas into said drying chambers in the lower to upper direction, said blowing chamber receiving said fluidized-bed forming-gas from said gas supply port.

2. The fluidized-bed granulation coating device according to claim 1, wherein said plurality of drying chambers are provided at radial positions relative to a rotating shaft rotated by said drying chamber drive means.

3. The fluidized-bed granulation coating device according to claim 1, wherein the interior of said blowing chamber is partitioned into a plurality of spaces, and fluidized-bed forming-gases having different flow rates are supplied into said respective spaces.

4. The fluidized-bed granulation coating device according to claim 1, wherein the powder grain discharge ports of said drying chambers pass through the interior of said blowing dumber and communicate with said product discharging section through a powder grain passing path into which said fluidized-bed forming-gas is not supplied.

* * * * *

UNITED STATES PATENT AND TRADEMARK OFFICE
CERTIFICATE OF CORRECTION

| | |
|---|---|
| PATENT NO. | : 7,112,244 B2 |
| APPLICATION NO. | : 10/275031 |
| DATED | : September 26, 2006 |
| INVENTOR(S) | : Narimichi Takei et al. |

It is certified that error appears in the above-identified patent and that said Letters Patent is hereby corrected as shown below:

Column 24, Claim 1, line 11, please delete the word "train" and replace it with --grain--.
Column 24, Claim 4, line 4, please delete the word "dumber" and replace it with --chamber--.

Signed and Sealed this

Twenty-third Day of January, 2007

JON W. DUDAS
*Director of the United States Patent and Trademark Office*